Patented July 15, 1924.

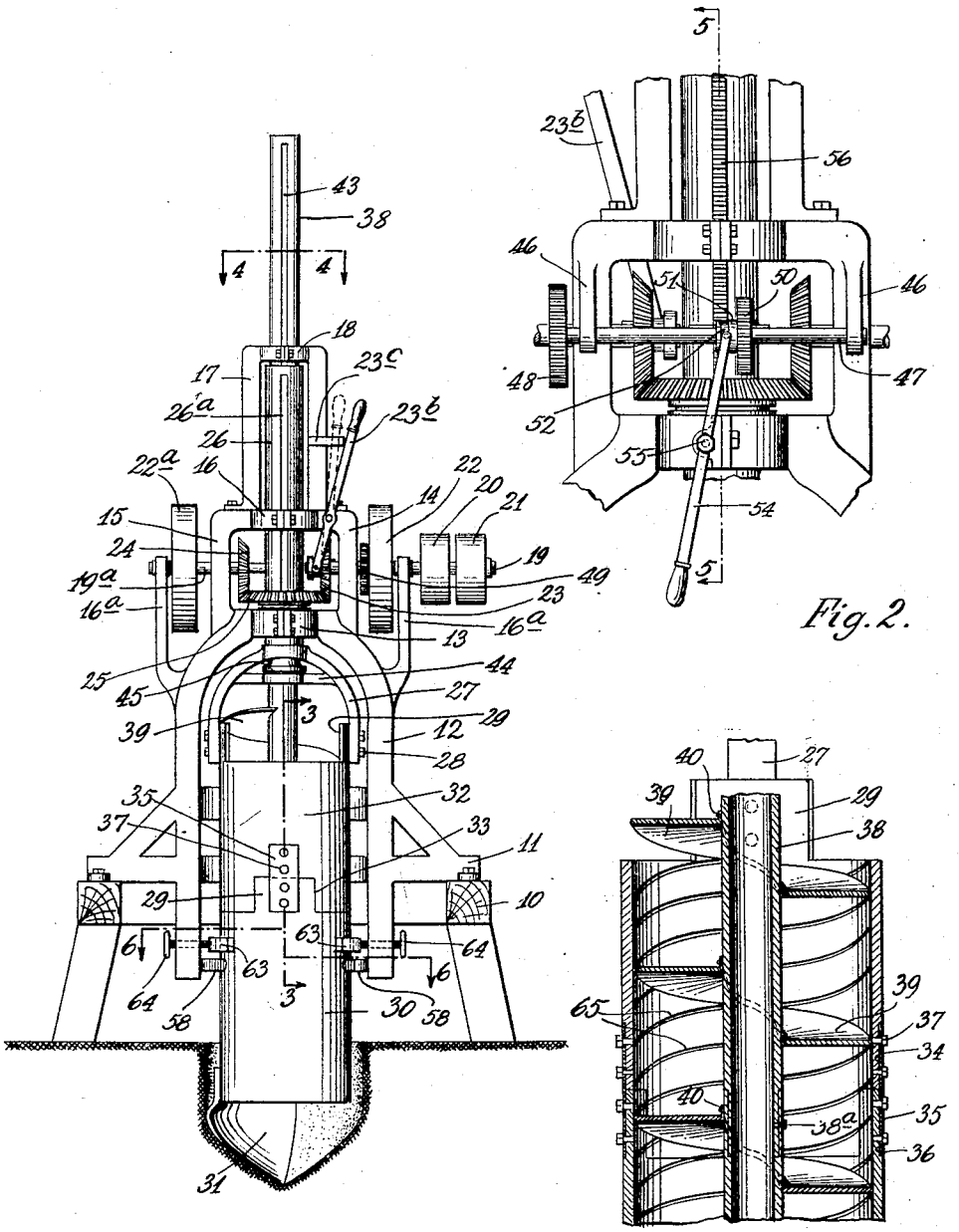

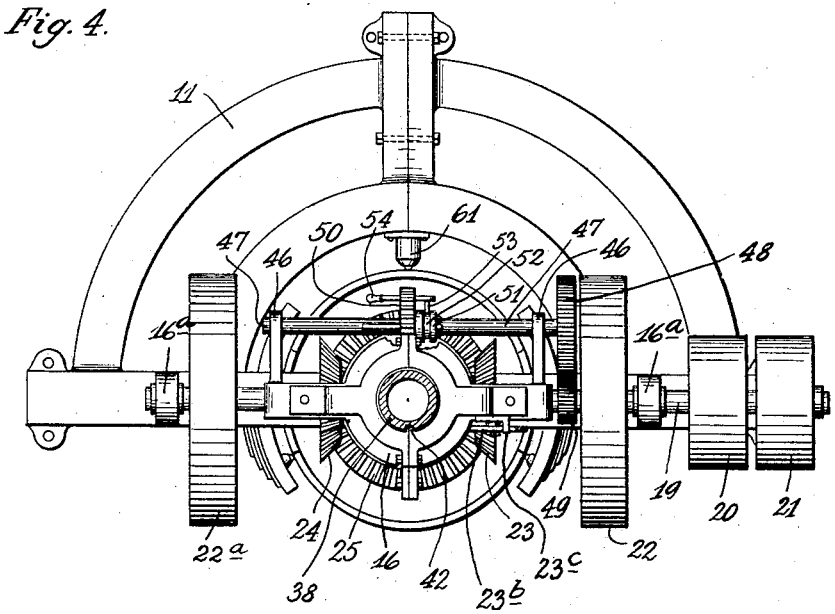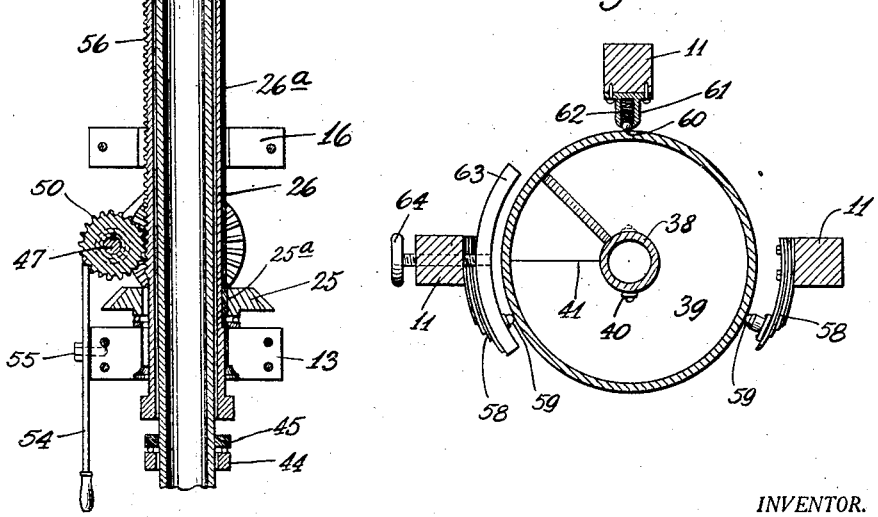

1,501,706

UNITED STATES PATENT OFFICE.

WENCESLAO GOIZUETA Y LÓPEZ DE ZUBIRIA, OF MILAGRO, SPAIN.

CONVEYING AND EXCAVATING MACHINE.

Application filed July 7, 1922. Serial No. 573,340.

*To all whom it may concern:*

Be it known that I, WENCESLAO GOIZUETA Y LÓPEZ DE ZUBIRIA, a subject of the King of Spain, and resident of Milagro, in the Province of Navarra and Kingdom of Spain, have invented certain new and useful Improvements in Conveying and Excavating Machines, of which the following is a specification.

Conveying or excavating systems using the principle of the Archimedean screw are well known and common but so far as I am aware such systems rely upon the rotation of the screw or spiral in a stationary casing. While such systems are fairly satisfactory a great difficulty with such apparatus resides in the fact that the substance is transported by the pressure of the rims or turns of the screw or spiral. If the conveyer is of considerable length the pressure upon the lowest turns of the spiral is excessive and causes frequent breakages. The principal object of this invention therefore is to provide a machine in which the screw or spiral is the stationary and the conveyer the rotary element, the material being transported by the frictional contact of the rotating casing.

The principal object of this invention is to provide a new and improved excavating machine which may be used for general excavating purposes, for tunneling, dredging or for loading and unloading of material in bulk such as sand, coal, grain, etc.

A further object is to provide a machine of this character which can be placed upon a stationary support or may be placed upon a boat, motor truck, or other suitable movable conveyance.

Another object is to provide an excavating device based upon the principle of the Archimedean screw but in which the screw comprises the stationary element and the enclosing casing or tube the movable element.

A further object is to provide a conveyer for an excavating device of the above character which comprises a number of detachable interlocking tubes and corresponding helical screw conveyer portions.

Another object is to provide a device of of the character set forth with means to raise and lower the conveying and digging means.

Another object is to provide means for clamping the lower sections of the excavating and conveying means to permit the convenient insertion or removal of additional sections when desired, and A further object is to provide a three point spring pressed steadying means for the casing or tube adjacent the digging end.

For the accomplishment of these and such further objects as will hereinafter be apparent to those skilled in the art to which this appertains, the invention consists in the construction, combination and arrangement of parts herein specifically described and illustrated in the accompanying drawings, wherein is shown a preferred embodiment of the invention, but it is to be understood that changes, variations and modifications may be resorted to which fall within the scope of the claims hereunto appended.

In the drawings forming a portion of this specification

Fig. 1 is a front elevation of a machine constructed according to my invention.

Fig. 2 is a partial rear elevation on an enlarged scale showing the conveyer elevating gearing in inoperative position.

Fig. 3 is a longitudinal central section on line 3—3 of Fig. 1.

Fig. 4 is a section on the line 4—4 of Fig. 1.

Fig. 5 is a section on the line 5—5 of Fig. 2 showing the conveyer elevating means in operative position.

Fig. 6 is a section on the line 6—6 of Fig. 1.

As shown in the drawings, the numeral 10 indicates generally any suitable support for the main frame of the machine. This main frame is preferably formed of two similar castings bolted together at the center line of the machine and comprises a semi-circular base portion 11 adapted to be secured to the support, and an upright main yoke shaped portion 12 which extends upwardly from the base portion and terminates in a bearing 13. Formed integral with the main yoke portion is an additional secondary yoke portion comprising a pair of vertical arms 14 and 15 and a horizontal bearing 16. Extending upwardly from the sides of the yoke portion 12 adjacent the bearing 13 are a pair of projecting vertical arms $16^a$ parallel with and spaced from the arms 14, 15. Secured to the top of the bearing 16 is an auxiliary frame member 17 provided with a bearing 18 for a purpose which will hereinafter appear.

Extending transversely across the machine and journalled in the arms 14 and $16^a$ is a main driving shaft 19, one end of which projects outwardly beyond the frame and has mounted thereon the fast and loose pulleys 20, 21 respectively. Located in the spaces between the arms 16ᵃ and the arms 14 and 15 are a pair of fly wheels 22, 22ᵃ while in the space between the arms 14 and 15 are located the bevel gears 23, 24. The fly wheel 22 is fixed upon the shaft 19 and a gear wheel 23 slidingly keyed thereto, the gear wheel 23 driving the gear 25 which in turn drives the gear 24 which is mounted upon a stub shaft 19ᵃ journaled in the arm 15 and the arm 16ᵃ shown at the left of Fig. 1. Secured to the stub shaft 19ᵃ is a second fly wheel 22ᵃ, the purpose of which is to balance the vibrations due to the driving mechanism. The gear wheel 23 is slidably mounted on the shaft 19 and is provided with a grooved hub 23ᵃ with which is suitably engaged the pivoted handle 23ᵇ a spring metal detent such as shown at 23ᶜ being provided to hold the handle in either of its positions with the gear 23 in operative or inoperative position.

The bevel gear 25 is provided with a key 25ᵃ slidably received in a key way 26ᵃ extending longitudinally of a tubular sleeve 26 upon the lower end of which is formed the driving bracket 27. The lower ends of the bracket 27 are drilled to receive the bolts 28 by means of which the upwardly projecting ears 29 of the conveyer casing sections may be interchangeably attached to the bracket.

The hollow cylindrical casing of the conveyer consists of a lower section 30 and a number of intermediate sections 32. Each of these sections is provided at its upper end with the projecting ears or tongues 29, the base of the lower section having secured thereto the digging implement or tool 31, while the base of each of the intermediate sections is cut out as at 33 to receive the projecting ears 29 of the adjacent lower section. The intermediate sections are machined off as at 34 adjacent the cut out portions 33 to provide a seat for the rectangular curved connecting plates 35, whereby the outer surfaces of the plates will be flush with the exterior of the casing, the ears 29 also being turned off as at 36 for the same purpose. Suitable fastening means such as the bolts 37 are provided to hold the sections secured together in interlocking engagement.

Passing through the center of the casing and in axial alignment therewith is the hollow tube or shaft 38 to which is secured a number of helical screw units 39 each of which is provided with an upturned flange 40 by means of which the units are secured to the tube 38. Each of these units extends around the tube 38 a complete 360° revolution and their edges 41 (see Fig. 6) are arranged in abutting relation so as to form a continuous Archimedean screw, a number of additional tube and screw sections of equal length to the intermediate sections 32 of the casing being provided for increasing the length of the screw to correspond to the length of the casing when a section or sections are added to the casing. Any suitable interlocking means, such as indicated at 38ᵃ (Fig. 3) being provided for the tube sections.

The tube 38 passes through the sleeve 26 and extends upwardly through the bearing 18 in which it is slidably received but is prevented from rotating therein by means of a key 42 formed on the interior of the bearing 18, which key is slidably received in the key way 43 extending longitudinally of the tube and terminating a short distance from the upper end of the tube, the end of the key way acting as a stop to limit the downward movement of the conveyer and suspend the conveyer system when not in operation. The outer diameter of the tube 38 and the inner diameter of the tubular sleeve 26 are proportioned to ensure a running fit.

Means are provided for raising the conveyer as follows, extending from one side of the arms 14 and 15 are a pair of lugs 46 provided with bearings to receive a jack shaft 47 having secured thereto at one end, a spur gear 48 meshing with a pinion 49 keyed to the main drive shaft 19. Slidingly keyed to the jack shaft 47 at the central part thereof is a spur gear 50 having a hub 51 integral therewith, the hub being provided with a circumferential groove 52 to receive a pin 53 projecting from the side of an operating lever 54 pivoted as at 55 to the frame of the machine. By moving the lever 54 the gear 50 may be shifted into or out of engagement with the rack 56 secured to the tubular sleeve 26 to raise the sleeve and with it the casing and screw.

At a point a short distance below the lower end of the tubular sleeve 26 a web 44 extends across between the arms of the bracket 27 and between this web and the base of the sleeve 26 is received a collar 45 which preferably is in two parts detachably secured to the hollow shaft 38. The purpose of this collar being to hold the casing and Archimedean screw in fixed relative longitudinal positions and to raise the screw when the casing is raised. The collar is made detachable to permit the ready dismantling of the parts when desired.

The legs of the yoke shaped portion of the main frame extend a short distance below the semi-circular base portion 11 and each of these downwardly extending portions has secured thereto one end of a curved laminated leaf spring 58, the outer or free end of each spring being provided with an antifriction ball 59 which is held in firm but yielding engagement with the exterior of the casing, a third antifriction ball 60 being held within a retaining bracket 61 secured at the centre of the base portion 11, a coiled spring 62 holding the ball 60 in engagement with exterior of the casing. It will be noted that these anti-friction balls are equally spaced to form a three point steady rest for the casing.

Located immediately above the anti-friction balls are a pair of clamping members each of which comprises an arcuate shaped clamping portion 63, the face of which is preferably covered with leather and to the back of which is secured a screw 64 which passes through a suitably tapped hole in the depending portion of the frame, to permit the clamp to be forced against or withdrawn from the casing as desired.

The interior of the casing sections are preferably provided with rifled grooves or corrugations 65 extending spirally therearound in a contrary sense to the helical stationary screw 39 as shown in Fig. 3, the purpose of these grooves being to produce a greater friction between the casing and the material and hence insure the better transportation of the material.

The operation of the device is as follows, assuming that a digging or excavating operation is about to be started the machine will only have secured thereto the lower conveyer casing section 30, the lower edge of the tool 31 will then be brought into contact with the ground and the shaft 19 will be put in operation, it being understood that the gear 50 will be moved out of engagement with the rack 56. The gear 23 is moved into mesh with the gear 25, by means of the handle 23$^b$ the spring detent 23$^c$ yielding to allow the movement of the handle and springing back into engagement with the handle to hold the same securely with the gears in meshing relation. The rotation of shaft 19 being transmitted through the gears 23, 25, causes the rotation of the casing 30 and with it the tool 31, the Archimedean screw being held against rotation by the key 42 and key way 43. The rotation of the tool 31 which is preferably somewhat scoop shaped will cause the material being excavated to be pushed upwardly into the casing, the rotation of the casing forcing the material upwardly along the screw from which it will be expelled in a transverse direction at the top of the casing, any suitable means being provided to carry the expelled material away. The weight of the parts will be sufficient to force the digging implement downwardly and when the conveyer has reached the limit of its downward movement as determined by the length of the key ways 26$^a$ and 43, the gears 23 and 25 will be moved out of mesh. The clamps 63 are screwed up against the exterior of the lower casing section and the bolts 28 are then removed thereby detaching the bracket 27 from the lower section. After this the handle 54 is actuated to bring the gear 50 into mesh with the rack 56 to raise the sleeve 26, bracket 27 and tube 38 to their upper limits and an intermediate casing section 32 and an additional Archimedean screw of equal length is then inserted into the machine, the casing sections being secured together in interlocking engagement by the plates 35 and bolts 37 while the screw sections are fastened together by means of the interlocking means 38$^a$.

The gear 50 is then disengaged from the rack 56 and the gears 23, 25 again placed in mesh and the digging operation is resumed.

It will be understood that any desirable number of sections may be employed and that the length of the sections may be varied according to the nature of the work being performed. I have found a length of two metres for each of the sections satisfactory for general purposes. The digging implement 31 should be so constructed and proportioned that it will extend slightly beyond the outer circumference of the casing so as to provide clearance between the walls of the excavation and the casing and its lower point should terminate either exactly at the extended axis of casing or should extend slightly beyond this axis to prevent leaving a central projecting mound of material.

Having thus described my invention, what I claim as new and desire to secure by Letters Patent is:

1. A device of the character described comprising a frame, an Archimedean screw mounted in said frame for reciprocation therein, means to prevent said screw from rotating, a casing substantially enclosing said screw and means to rotate said casing.

2. A device of the character described comprising a frame, an Archimedean screw mounted in said frame for reciprocation therein, means to prevent said screw from rotating, a casing substantially enclosing said screw, means to rotate said casing, and means to raise said screw and casing.

3. A device of the character set forth comprising a frame, a tubular sleeve mounted for rotation and reciprocation in said frame, driving mechanism for rotating said tubular sleeve, a casing, means for securing said casing to said tubular sleeve, a tube mounted within said tubular sleeve, an Archimedean screw mounted on said tube and bearing means for said tube mounted on said frame, said bearing means and tube provided with means to permit reciprocation of said tube but prevent rotation thereof.

4. A device of the character set forth comprising a frame, a tubular sleeve mounted for rotation, and reciprocation in said frame, driving mechanism for rotating said tubular sleeve, a casing, means for securing said casing to said tubular sleeve, a tube mounted within said tubular sleeve, an Archimedean screw mounted on said tube, bearing means for said tube mounted on said frame, said bearing means and tube provided with means to permit reciprocation of said tube but prevent rotation thereof, and means for raising said tubular sleeve and tube.

5. A device of the character set forth comprising a frame, a tubular sleeve mounted for rotation, and reciprocation in said frame, driving mechanism for rotating said tubular sleeve, a casing, means for securing said casing to said tubular sleeve, a tube mounted within said tubular sleeve, an Archimedean screw mounted on said tube, bearing means for said tube mounted on said frame, said bearing means and tube provided with means to permit reciprocation of said tube but prevent rotation thereof, means to prevent relative longitudinal movement between said tubular sleeve and tube, and means for raising said tubular sleeve.

6. A device of the character set forth comprising a frame, a tubular sleeve mounted for rotation and reciprocation in said frame, driving mechanism for rotating said tubular sleeve, a casing, means for securing said casing to said tubular sleeve, a tube mounted within said tubular sleeve, an Archimedean screw mounted on said tube, bearing means for said tube mounted on said frame, said bearing means and tube provided with means to permit reciprocation of said tube but prevent rotation thereof, means to prevent relative longitudinal movement between said tubular sleeve and tube, a rack carried by said tube and gearing connected with said driving mechanism adapted to be engaged with said rack to raise said tubular sleeve and tube.

7. A device of the character set forth comprising a frame, an Archimedean screw carried by said frame, and a casing substantially enclosing said screw, said casing and screw each comprising a plurality of detachable sections, a digging implement carried by the lower section of said casing, means to prevent rotation of said screw and means to rotate said casing.

8. A device of the character described, comprising a frame, an Archimedean screw mounted in said frame for reciprocation therein, means to prevent said screw from rotating, a casing substantially enclosing said screw, means to rotate said casing, means carried by the lower portion of said frame adapted to engage lower portion of said casing to prevent lateral movement thereof and yielding means to hold said last mentioned means in engagement with said casing.

9. A device of the character set forth comprising a frame, an Archimedean screw carried by said frame, and a casing substantially enclosing said screw, said casing and screw each comprising a plurality of detachable sections, clamping means carried by said frame adapted to engage with the lower section of said casing and hold the same against movement while additional sections are being attached to said screw and casing.

10. A device of the character described comprising a frame, an Archimedean screw mounted in said frame for reciprocation therein, means to prevent said screw from rotating, a casing substantially enclosing said screw, means to rotate said casing, the interior of said casing being provided with spirally arranged grooves.

11. A device of the character described comprising a frame, an Archimedean screw mounted in said frame for reciprocation therein, means to prevent said screw from rotating, a casing substantially enclosing said screw, means to rotate said casing, the interior of said casing being provided with grooves extending spirally therein in a reverse direction to the spiral of the Archimedean screw.

Signed at Milagro in the Province of Navarra and Kingdom of Spain this 26 day of May A. D. 1922.

WENCESLAO GOIZUETA y LÓPEZ de ZUBIRIA.